US011087324B2

(12) United States Patent
Dintenfass et al.

(10) Patent No.: US 11,087,324 B2
(45) Date of Patent: Aug. 10, 2021

(54) PRE-AUTHORIZED SECURE RESOURCE ALLOCATION SYSTEM

(71) Applicant: BANK OF AMERICA CORPORATION, Charlotte, NC (US)

(72) Inventors: Katherine Dintenfass, Lincoln, RI (US); Alicia C. Jones-McFadden, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 112 days.

(21) Appl. No.: 16/447,498

(22) Filed: Jun. 20, 2019

(65) Prior Publication Data
US 2020/0402053 A1    Dec. 24, 2020

(51) Int. Cl.
G06Q 20/40    (2012.01)
G06Q 20/02    (2012.01)
G06Q 20/38    (2012.01)

(52) U.S. Cl.
CPC ......... *G06Q 20/4014* (2013.01); *G06Q 20/02* (2013.01); *G06Q 20/388* (2013.01)

(58) Field of Classification Search
USPC .......................................................... 705/75
See application file for complete search history.

(56) References Cited

U.S. PATENT DOCUMENTS

| | | | |
|---|---|---|---|
| 7,593,898 B1 | 9/2009 | Tsuei et al. | |
| 7,711,639 B2 | 5/2010 | Reid et al. | |
| 7,797,235 B2 | 9/2010 | German et al. | |
| 8,036,985 B2 | 10/2011 | Reid et al. | |
| 8,438,070 B2 | 5/2013 | Butler | |
| 8,744,921 B2 | 6/2014 | Butler | |
| 9,978,068 B2* | 5/2018 | Butterfield | G06Q 20/10 |
| 10,044,866 B2* | 8/2018 | Sharpe | G06Q 30/0261 |
| 10,121,153 B1 | 11/2018 | Diller et al. | |
| 10,574,689 B1* | 2/2020 | Hoyos | H04W 12/06 |
| 2011/0219241 A1* | 9/2011 | Takeda | G06F 21/80 |
| | | | 713/193 |
| 2015/0135282 A1* | 5/2015 | Kong | H04L 63/126 |
| | | | 726/4 |
| 2016/0104159 A1* | 4/2016 | Butterfield | G06Q 20/384 |
| | | | 705/44 |
| 2019/0109885 A1* | 4/2019 | Kurian | H04L 67/12 |

* cited by examiner

*Primary Examiner* — Firmin Backer
(74) *Attorney, Agent, or Firm* — Michael A. Springs; Moore & Van Allen PLLC; Jeffrey R. Gray

(57) ABSTRACT

An interaction and resource exchange system that provides authentication for a designated user to complete an interaction entered into by an initiating user. An initiating user is able to enter into interactions with third-parties and set one or more interaction limits and/or designated user requirements to allow a designated user to complete the interaction with the third-party should interaction limits and/or designated user requirements be met. The interaction limits and/or the designated user requirements allow for improved security related to these types of interactions and resource exchanges. In particular, the interaction and resource exchange may be implemented through a real-time resource exchange network that efficiently allows for the designated user to complete the interaction.

18 Claims, 2 Drawing Sheets

US 11,087,324 B2

PRE-AUTHORIZED SECURE RESOURCE ALLOCATION SYSTEM

FIELD

The present invention relates to pre-authorization for resource interactions, and more particularly to a resource interaction system that pre-authorizes an interaction and allows for the completion of the interaction by other entities based on the pre-authorization.

BACKGROUND

Resource processing for interactions typically requires the entities that entered into the interaction to complete the interaction for security purposes and because of system limitations. Present resource interaction systems do not allow for entities to enter into interactions and allow other entities to complete the interaction in a secure way.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

Embodiments of the invention comprise a system, a computer implemented method, and/or a computer program product for an interaction and resource exchange system that provides authentication for a designated user to complete an interaction entered into by an initiating user. The system allows an initiating user to enter into interactions with third parties and set one or more interaction limits and/or designated user requirements to allow a designated user to complete the interaction with the third-party should the interaction limits and/or the designated user requirements be met. The third party may aid in providing products (e.g., goods and/or services) associated with an interaction in exchange for resources should the interaction meet the interaction limits and the designed user meet the designated user requirements, as will be described in further detail herein.

It should be understood that the present invention may be implemented through any type of resource exchange, such as traditional rails used to transfer resources (e.g., using clearing houses, or the like), however, the interactions and/or resource exchanges may be particularly beneficial when utilized along with a real-time resource transfer network. As will be described herein in further detail, the present disclosure may be implemented through a resource interaction system that may routes resources using a real-time payment network. Using real-time network clearing, the system may provide real-time reconciliation processing along the real-time payment network. The system may confirm a transaction, confirm that resources have been exchanged, and provide end-of-minute confirmation that both sides of an interaction are whole and reconciliation has been completed.

Currently, the confirmation of reconciliation across various entities comes in the form of an end-of-day data packet from a payment network or rail, and not in real-time (e.g., end-of-minute, near instantaneously, or instantaneously, or the like) as presented in the present disclosure in some embodiments of the invention. For example, in traditional reconciliation an entity (e.g., individual, other party, or the like) may transfer resources across organizations (e.g., financial institutions) to another entity. In this way, the organization may remove resources from a resource pool (e.g., account) associated with a first entity at the organization and move it to a federal account. A payment network moves resources into another resource pool at another organization associated with the second entity. However, the other organization houses the resources until the end of the day reconciliation. Until then, the second entity does not have the resources in the resource pool.

Alternatively, in some embodiments of the present disclosure, the systems may be utilized to provide a real-time resource transfer reconciliation process. Using real-time network clearing, the systems may provide real-time reconciliation processing along a real-time payment network. As such, the resources are transferred in real time out of a first entity's resource pool across the real-time payment network into the second entity's resource pool without lag from network processing. The system tracks the resources across the network and confirms a transaction, confirming that resources have been exchanged, and thereby providing a real-time confirmation that both parties are whole and reconciliation has been completed.

The resource interaction systems of the present disclosure may be utilized to facilitate the interactions, and corresponding resource transfers, in which the initiating user enters with a third-party, and further allows for the completion of the interaction by a designated user. Entering the interactions through a real-time resource transfer network allows for efficiently placing interaction limits and/or designated user requirements, and verifying the foregoing before allowing the interaction to proceed.

Embodiments of the invention comprise systems, computer implemented method, and computer program products for a resource interaction and exchange system. The invention comprises identifying an interaction between an initiating user and a third-party and identifying a designated user is completing the interaction with the third-party. The invention further comprises verifying one or more interaction limits for the interaction and verifying one or more designed user requirements for the interaction for the designated user. The invention comprises allowing the interaction when the one or more interaction limits and the one or more designated user requirements are met, and denying the interaction when at least one of the one or more interaction limits or the one or more designated user requirements fail to be met. The invention also reconciles the interaction when the interaction is allowed by transferring resources of the initiating user to the third-party.

In further embodiments, the invention further comprises receiving the one or more designated user requirements from the initiating user.

In other embodiments of the invention, verifying the one or more designated user requirements for the interaction comprises sending the one or more designated user requirements to a third-party system, and receiving verification from the third-party system when the designated user completing the interaction has met the one or more designated user requirements.

In yet other embodiments of the invention, verifying the one or more designated user requirements for the interaction comprises sending the one or more designated user requirements to a designated user computer system, and receiving verification from a third-party system when the designated user completing the interaction has met the one or more designated user requirements.

In still other embodiments of the invention, the one or more designated user requirements comprise a designated user identifier comprising one or more of a designed user name, address, photograph, a mobile phone number, location determination device indicator, digital wallet number, or a tokenized interaction string.

In other embodiments, the invention further comprises sending an interaction notification to an initiating user computer system, and receiving an interaction verification from the initiating user computer system indicating that the interaction is approved.

In further accord with embodiments of the invention, the interaction notification comprises a project photograph illustrating completion of at least a portion of the product.

In other embodiments, the invention further comprises receiving the one or more interaction limits from the initiating user.

In still other embodiments of the invention, verifying the one or more interaction limits for the interaction comprises sending the one or more interaction limits to a third-party system, and receiving verification from the third-party system when the designated user completing the interaction has met the one or more interaction limits.

In yet other embodiments of the invention, verifying the one or more interaction limits for the interaction comprises sending the one or more interaction limits to a designated user computer system, and receiving verification from the third-party system when the designated user completing the interaction has met the one or more interaction limits.

In other embodiments of the invention, the one or more interaction limits comprise a resource amount, an interaction completion time, one or more specific products.

In further accord with embodiments, the invention further comprises providing the one or more interaction limits or the one or more designated user requirements to the third-party system through a designed user computer system.

In other embodiments of the invention, identifying the interaction between the initiating user and the third-party comprises receiving an indication from the initiating user regarding the interaction with the third-party.

In still other embodiments of the invention, identifying the designated user completing the interaction with the third-party comprises receiving an identity of the designated user from the initiating user computer system.

In yet other embodiments of the invention, the identity of the designated user is based on a mobile device number, a digital wallet identification, a designated user identifier, a designated user photograph, a designated user photograph ID.

To the accomplishment the foregoing and the related ends, the one or more embodiments comprise the features hereinafter described and particularly pointed out in the claims. The following description and the annexed drawings set forth certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
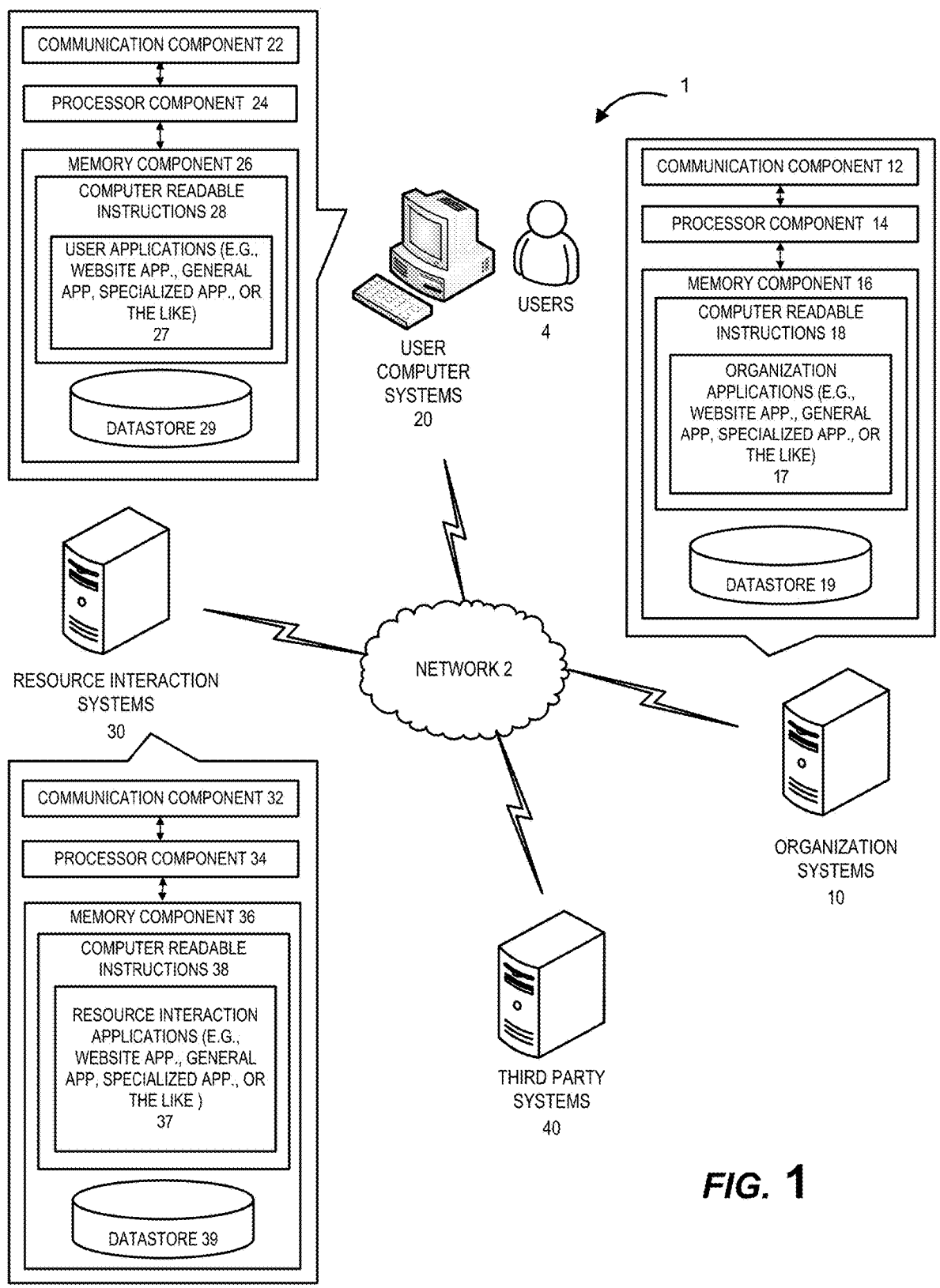

Having thus described embodiments of the invention in general terms, reference will now be made to the accompanying drawings, and wherein:

FIG. 1 illustrates a block diagram of a resource transfer system environment, in accordance with embodiments of the invention.

Figure 2:
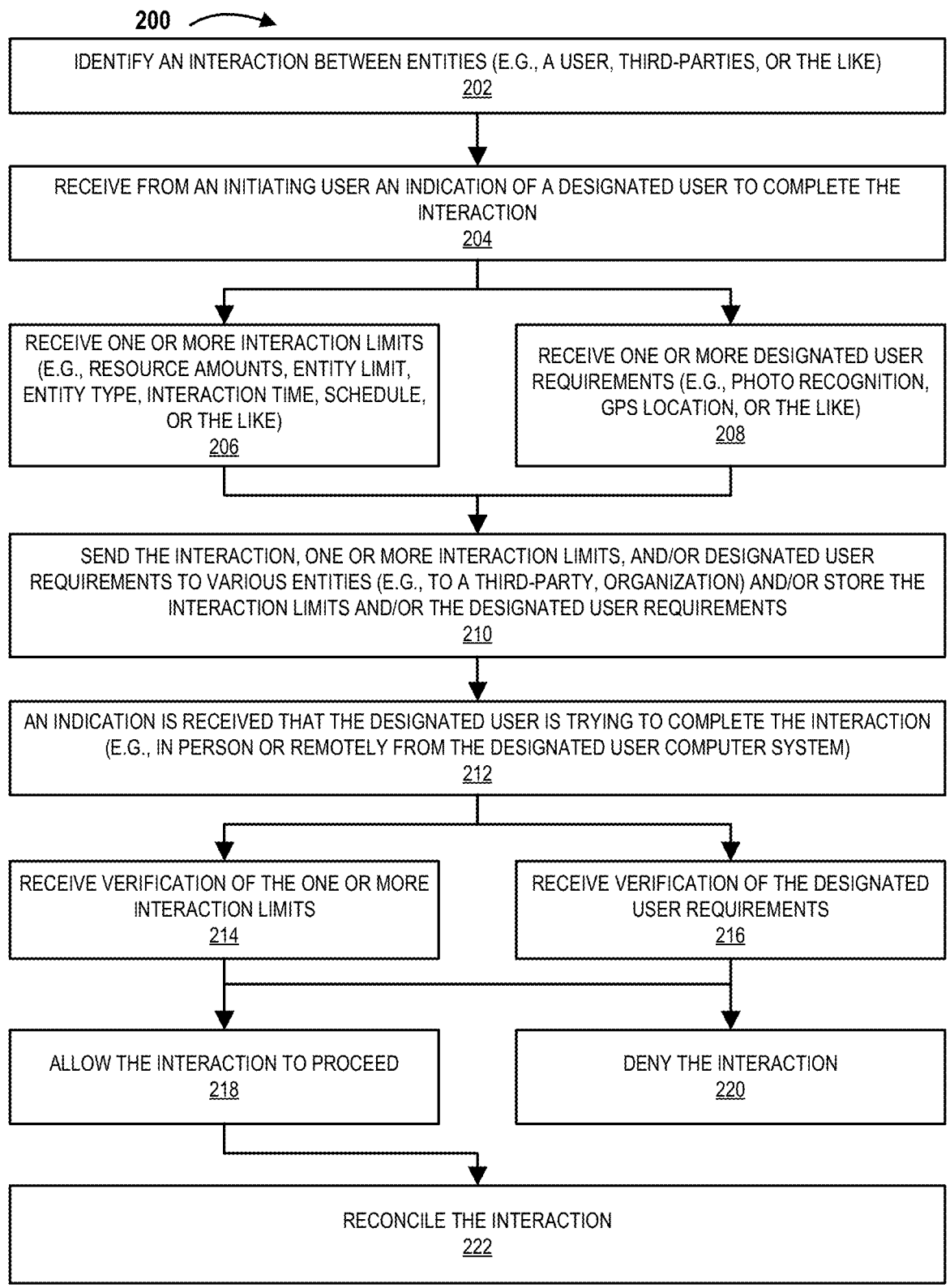

FIG. 2 illustrates a process for transferring resources and allowing entity communication, in accordance with embodiments of the invention.

DETAILED DESCRIPTION OF EMBODIMENTS OF THE INVENTION

Embodiments of the invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. In the following description, for purposes of explanation, numerous specific details are set forth in order to provide a thorough understanding of one or more embodiments. It may be evident, however, that such embodiment(s) may be practiced without these specific details. Like numbers refer to like elements throughout.

Embodiments of the present disclosure relate to a resource interaction system that is utilized to allow the entities to enter into interactions, and thereafter, the one or more initiating entities may allow one or more designated entities to complete the interaction. The one or more initiating entities may set interaction limits and/or designated entity requirements that are to be met before the interactions may be completed. It should be understood that the present resource interaction systems may utilize traditional resource processing or real-time resource processing (e.g., real-time payment network), as will be described herein.

FIG. 1 illustrates a resource interaction system environment 1, in accordance with embodiments of the invention. As illustrated in FIG. 1, one or more organization systems 10 are operatively coupled, via a network 2, to one or more user computer systems 20, one or more resource interaction systems 30, one or more third party systems 40, and/or one or more other systems (not illustrated).

In this way, the one or more organization systems 10 may be the systems that run the applications that the organization uses within the organization's operations (e.g., that store and process interactions using resources from resource pools of entities). The users 4 (e.g., one or more associates, employees, agents, contractors, sub-contractors, representatives, customers, or the like), may include customers, representatives of third-parties (e.g., merchants, third-parties intermediaries, or the like), employees of the organization, or the like. The users 4 may use the user computer systems 20 to enter into interactions with each other directly and/or through third parties systems 40 (e.g., customer user entering into an interaction with an employee user and/or the third party through the third party systems 40, first user entering into an interaction with a second user, transferring resources with respect to a product, and/or the like). The resource interaction systems 30 may be utilized to allow the users 4 (e.g., initiating users) to enter into interactions with third-parties (e.g., merchants) and set one or more interaction limits and/or designated user requirements to allow a designated user 4 to complete the interaction with the third-party should the interaction limits and/or the designated user requirements be met. The third party systems 40, as discussed above may be used by third-parties to aid in providing products (e.g., goods and/or services) associated with an interaction. The other systems (not illustrated) may act as an intermediary between the various systems described herein. The users 4 and/or third-parties may each be described as entities, such that a first entity may enter into interactions and/or communicate with a second entity using the resource transfer systems 30, which may be provided by an organization and/or another third-party, as will be described herein.

The network 2 illustrated in FIG. 1 may be a global area network (GAN), such as the Internet, a wide area network (WAN), a local area network (LAN), or any other type of network or combination of networks. The network 2 may provide for wireline, wireless, or a combination of wireline and wireless communication between systems, services, components, and/or devices on the network 2.

As illustrated in FIG. 1, the one or more organization systems 10 generally comprise one or more communication components 12, one or more processor components 14, and one or more memory components 16. The one or more processor components 14 are operatively coupled to the one or more communication components 12 and the one or more memory components 16. As used herein, the term "processor" generally includes circuitry used for implementing the communication and/or logic functions of a particular system. For example, a processor component 14 may include a digital signal processor, a microprocessor, and various analog-to-digital converters, digital-to-analog converters, and other support circuits and/or combinations of the foregoing. Control and signal processing functions of the system are allocated between these processor components according to their respective capabilities. The one or more processor components 14 may include functionality to operate one or more software programs based on computer-readable instructions 18 thereof, which may be stored in the one or more memory components 16.

The one or more processor components 14 use the one or more communication components 12 to communicate with the network 2 and other components on the network 2, such as, but not limited to, the one or more user computer systems 20, the one or more resource interaction systems 30, the one or more third party systems 40, and/or other systems (not illustrated). As such, the one or more communication components 12 generally comprise a wireless transceiver, modem, server, electrical connection, electrical circuit, or other component for communicating with other components on the network 2. The one or more communication components 12 may further include an interface that accepts one or more network interface cards, ports for connection of network components, Universal Serial Bus (USB) connectors and the like.

As further illustrated in FIG. 1, the one or more organization systems 10 comprise computer-readable instructions 18 stored in the one or more memory components 16, which in one embodiment includes the computer-readable instructions 18 of organization applications 17 (e.g., web-based applications, dedicated applications, specialized applications, or the like that are used to operate the organization, which may be internal and/or external applications). In some embodiments, the one or more memory components 16 include one or more data stores 19 for storing data related to the one or more organization systems 10, including, but not limited to, data created, accessed, and/or used by the one or more organization applications 17. The one or more organization applications 17 may be applications that are specifically used for operating the organization (e.g., the external and/or internal operation of the organization), such as by communicating (e.g., interacting with, or the like) the one or more user computer systems 20 and user applications 27, the one or more resource interaction systems 30 and resource interaction applications 37, the third party systems 40 (and applications thereof), and/or other systems and applications thereof (not illustrated). It should be understood that the one or more organization applications 17 may comprise the applications that are used by the organization to control, monitor, deliver, transfer, or the like, the resources of its customers (e.g., between user and/or third party systems, such as product provider systems, or the like).

As further illustrated in FIG. 1, the one or more user computer systems 20 are operatively coupled, via a network 2, to the one or more organization systems 10, the one or more resource interaction systems 30, the one or more third party systems 40, and/or the one or more other systems (not illustrated). As illustrated in FIG. 1, users 4 may use the resource interaction systems 30 to enter into interactions with other entities (e.g., other users, third parties, or the like); set one or more interaction limits and/or one or more designated user requirements; designate one or more designated users; send the interaction, one or more interaction limits, and/or one or more designated user requirements to the other entities (e.g., other users, third parties, or the like); and/or receive verification in order to complete the interaction, and transfer resources, as will be discussed in further detail herein.

It should be understood that the one or more user computer systems 20 may be any type of device, such as a desktop, mobile device (e.g., laptop, smartphone device, PDA, tablet, watch, wearable device, mobile interaction terminal, or other mobile device), interaction terminal, server, and/or any other type of system hardware that generally comprises one or more communication components 22, one or more processor components 24, one or more memory components 26, and/or the one or more user applications 27, such as web browser applications, dedicated applications, specialized applications, or portions thereof. The one or more processor components 24 are operatively coupled to the one or more communication components 22, and the one or more memory components 26. The one or more processor components 24 use the one or more communication components 22 to communicate with the network 2 and other components on the network 2, such as, but not limited to, the one or more organization systems 10, other user computer systems 20, the one or more resource interaction systems 30, the one or more third party systems 40, and/or other systems (not illustrated). As such, the one or more communication components 22 generally comprise a wireless transceiver, modem, server, electrical connection, or other component for communicating with other components on the network 2. The one or more communication components 22 may further include an interface that accepts one or more network interface cards, ports for connection of network components, Universal Serial Bus (USB) connectors and/or the like. Moreover, the one or more communication components 22 may include a keypad, keyboard, touch-screen, touchpad, microphone, speaker, mouse, joystick, other pointer, button, soft key, and/or other input/output(s) for communicating with the users 4.

As illustrated in FIG. 1, the one or more user computer systems 20 may have computer-readable instructions 28 stored in the one or more memory components 26, which in one embodiment includes the computer-readable instructions 28 for user applications 27, such as dedicated applications (e.g., apps, applet, or the like), portions of dedicated applications, a web browser or other applications that allow the one or more user computer systems 20 to perform the actions described herein (e.g., enter interactions, transfer resources, communicate directly with the opposing entity, or the like).

As illustrated in FIG. 1, the one or more resource interaction systems 30 are operatively coupled, via a network 2, to the one or more organization systems 10, the one or more user computer systems 20, the one or more third party systems 30, and/or the other systems. The resource interaction systems 30, as will be described in further detail herein, may be utilized to enter into interactions with other entities (e.g., other users, third parties, or the like), as described herein. In some embodiments the resource interaction systems 30 (e.g., a real-time payment system, or the like) may utilize real-time resource transfers between entities (e.g., users 4, third parties, or the like), as well as communications between the entities directly with each other (instead of through traditional networks) and/or routing of resources that are more efficient, and thus, more cost effective, as will be discussed herein. It should be understood that the one or more resource interaction systems 30 may be a part of, and thus controlled by the organization, a third party, and/or by other systems (not illustrated). As such, the one or more resource interaction systems 30 may be supported by a third-party and/or by the organization.

The resource interaction systems 30 generally comprise one or more communication components 32, one or more processor components 34, and one or more memory components 36. The one or more processor components 34 are operatively coupled to the one or more communication components 32, and the one or more memory components 36. The one or more processor components 34 use the one or more communication components 32 to communicate with the network 2 and other components on the network 2, such as, but not limited to, the one or more organization systems 10, the one or more user computer systems 20, the one or more third party systems 40, and/or the other systems. As such, the one or more communication components 32 generally comprise a wireless transceiver, modem, server, electrical connection, or other component for communicating with other components on the network 2. The one or more communication components 32 may further include an interface that accepts one or more network interface cards, ports for connection of network components, Universal Serial Bus (USB) connectors and the like.

As illustrated in FIG. 1, the one or more resource transfer systems 30 may have computer-readable instructions 38 stored in the one or more memory components 36, which in some embodiments includes the computer-readable instructions 38 of one or more resource interaction applications 37 that allow the entities (e.g., users 4, third party product providers, or the like) to enter into interactions using the user computer systems 20 through the one or more organization systems 10 (or the one or more third party systems 40), to communicate with each other directly regarding the interactions, and/or to place on and/or receive conformation of the requirements (e.g., interaction limits and/or designated user requirements, or the like) of the interaction, as will be described herein.

Moreover, the one or more third party systems 40 and/or other systems may be operatively coupled to and communicate with the one or more organization systems 10, the one or more user computer systems 20, and/or the one or more resource interaction systems 30, through the network 2. The one or more third party systems 40 and/or the one or more other systems may have the same or similar components as the one or more organization systems 10, the one or more user computer systems 20, and/or the one or more resource interaction systems 30 (e.g., communication component, processor component, memory component—computer readable instructions for applications, datastore), and/or each other in the same or similar way as previously described with respect to the one or more organization systems 10, the one or more user computer systems 20, and/or the one or more resource interaction systems 30.

The one or more third party systems 40 may comprise the systems that a third party (e.g., a product provider) uses to enter into interactions with users 4. For example, the third-party may be a merchant that provides a product (e.g., goods or services) to a user 4 (e.g., the designated user) during an interaction, and collects resources from another user 4 (e.g., the initiating user) through the one or more organization systems 10. It should be understood that both the user 4 (e.g., initiating user) and the product provider may have resource pools (e.g., accounts, or the like) with one or more organizations in order to allow for a resource transfer associated with the interaction.

A resource pool (e.g., an account) is the relationship that an entity (e.g., user or third-party—such as a merchant) has with an organization, such as a financial institution. Examples of resource pools include a deposit resource pool, such as an interaction account (e.g., a banking account), a savings resource pool, an investment resource pool, a money market resource pool, a time deposit resource pool, a demand deposit resource pool, a pre-paid resource pool, credit resource pool, a non-monetary entity information that includes information associated with the entity that allows for the transfer of resources, or the like. The resource pool is associated with and/or maintained by the organization. Moreover, it should be understood that resources may include funds in the resource pools of the entity and/or other property owned by the entity. The resources may be associated with resource pools or may be property that is not associated with a specific resource pool. Examples of resources associated with resource pools may be accounts that have cash or cash equivalents, or resource pools that are funded with or contain property, such as safety despots that contain jewelry, a trust resource pool that is funded with property, or the like. Examples of resources that may not be associated with resource pools may be products, such as antiques in a user's home, jewelry in a user's home, or the like.

A resource transfer refers to any movement of resources, including a change in ownership of the resources between a first entity (e.g., first user or first merchant) and a second entity (e.g., second user or second merchant) directly and/or through an organization. For example, a resource transfer may relate to an interaction (e.g., transaction, transfer, or the like), such as a purchase of a product (e.g., goods or services), a return of a product, a payment interaction, a credit interaction, lines of credit interaction, automated teller machine (ATM) interaction, or other interaction involving an entity's resource pool. An interaction may include one or more of the following: renting, selling, and/or leasing product(s) (e.g., cars, apartments, furniture, tools, or the like); making payments to creditors (e.g., paying monthly bills, paying federal, state, and/or local taxes; and the like); sending remittances; loading money onto stored value cards (SVCs) and/or prepaid cards; donating to charities; splitting payments for products (e.g., splitting hotel, dinner, lunch, transportation, or like costs), and/or the like.

An interaction involving a resource transfer may also refer to a resource transfer between entities (e.g., users, merchants, processor or settlement entities, and/or other entities) participating in and leveraging a settlement network operating in real-time (e.g., real or near real-time for twenty-four hours a day, seven days a week, or the like), wherein settlement of the interaction occurs at or very close in time to the time to the interaction. A real-time interaction may include a payment, wherein resource interaction systems 30 (e.g., including a real-time interaction system) enables participants to initiate credit transfers, receive settlement for credit transfers, and make available to a receiving entity funds associated with the credit transfers in real-time, wherein the credit transfer may be final and irrevocable. Real-time interactions or payments provide marked improvements over conventional interaction clearing and payment settlement methods (e.g., automated clearing house (ACH), wire, or the like) which can require several hours, days, or longer to receive, process, authenticate a payment, and make funds available to the receiving participant which may, in total, require several back-and-forth communications between organizations facilitating the resource transfer (e.g., financial institutions). In some cases, conventional settlement methods may not be executed until the end of the business day (EOB), wherein payments are settled in batches between the organizations.

Real-time interactions reduce settlement time by providing pre-authentication or authentication at the time of a requested interaction in order to enable instantaneous (e.g., immediate or near-instantaneous) settlement between organizations at the time of the interaction, wherein resources or funds may be made immediately available to a receiving user (e.g., payee) following completion of the interaction. Examples of real-time interactions include business to business interactions (e.g., supplier payments), business to consumer interactions (e.g., legal settlements, insurance claims, employee wages), consumer to business interactions (e.g., bill pay, hospital co-pay, payment at point-of-sale), and peer to peer (P2P) interactions (e.g., repayment or remittance between friends and family or others). In a specific example, a real-time interaction may be used for payment of a utility bill on the due date of the bill to ensure payment is received on-time and accruement of additional payment due to late payment is avoided. In another example, real-time interactions may be especially beneficial for small entities and users (e.g., small merchants/businesses) that may have a heavier reliance on short-term funds and may not prefer to wait days for interaction settlements.

Real-time interactions not only provide settlement immediacy, but also provide assurance, misappropriation reduction, and bank-grade security to payments due to the inherent nature of the payment and user authentication infrastructure. Further, real-time interactions reduce processing requirements, processing memory, and/or processing costs due to the simplified nature of required communication when compared to conventional settlement methods. In some embodiments, real-time interaction systems further include information and conversation tools provided by the organization that enhance the experience of the entities participating in the in the interactions. It should be understood that in some embodiments the interaction requests for the resource transfers may comply with ISO 20022.

FIG. 2 illustrates a resource interaction and exchange process, in accordance with one or more embodiments of the invention. As illustrated in block 202 of FIG. 2, an interaction between entities is identified. It should be understood that this may include an initiating user entering into an interaction with a third-party (e.g., a merchant) for a product (e.g., good and/or service) offered by the third-party. It should be understood that the initiating user may enter the interaction with the third-party in person or remotely, through a network 2, such as through an application. For example, the initiating user may purchase a product from the merchant using an initiating user resource pool (e.g., an initiating user account held by the organization) using an initiating user computer system (e.g., an initiating user mobile device). It should be understood that the interaction may be received by one or more organizations (e.g., an entity holding resources for the initiating user). It should be further understood that the indication of the interaction may be received directly by the organization, or indirectly by the organization through an intermediary of the organization.

It should be understood that in some embodiments, the interaction may be a specific interaction with a third-party, or may be a proposed interaction that the initiating user 4 may want to enter into with different potential third-parties. Alternatively, the interaction may be made directly with the designated user 4. As such, the indication of the interaction may be presented to a specific third-party or designated user, or the indication of the interaction may be stored within the system (e.g., by the organization systems) until the designated user enters the interaction with a specific third-party and/or completes specific requirements, at which time the interaction will be processed as described herein. In this way, the initial interaction that the initiating user requested may be preliminary and as such it may or may not have a corresponding finalized resource amount, an interaction time period (e.g., range of time for the interaction be completed), a product limit (e.g., types of products for the interaction), third-party limits (e.g., the third-parties with which the interaction may occur), or the like as will be discussed herein.

Block 204 of FIG. 2 further illustrates that an indication of a designated user to complete the interaction is received from an initiating user. For example, the initiating user may be entering the interaction with the third-party; however, it should be understood that the product may not be provided until a later point in time and/or the initiating user is located at a location away from where the product will be provided. As such, the initiating user may identify a designated user that is going to complete the interaction by receiving the product and/or by finalizing the interaction to allow for the transfer of resources from the initiating user (e.g., the initiating user resource pool). The initiating user may identify the designated user through attaching a designed user name, address, photograph, a mobile phone number, location determination device indicator, a digital wallet number, and/or the like to the interaction (e.g., to an interaction request within the network), which may be referred to as a designated user identifier. In some embodiments of the invention, the designated user identifier may be a token identifier made up of characters (e.g., numbers, alphabetic, symbols, combinations thereof, or the like), codes (e.g., barcode, QR code, or the like), and/or images (e.g., photographs of any item, drawings, or the like). The designated user identifier may be sent to the designated user's computer system 20 and/or the third-party, and/or may be attached to the interaction (e.g., to the interaction request within the network). The designated user identifier may be unique to the interaction and/or the designated user. Moreover, multiple designated user identifiers may be utilized.

Block 206 of FIG. 2 further illustrates that the initiating user may further provide one or more interaction limits associated with the interaction. For example, the initial indication that the initiating user entered into an interaction with the third-party may be a preliminary interaction that may or may not have a finalized resource amount, an interaction time period (e.g., range of time for the interaction be completed), product limit (e.g., types of products for the interaction), third-party limits (e.g., the third-parties with which the interaction may occur), or the like. It should be noted that the one or more interaction limits may be provided at the time of providing the indication of the interaction from block 202, or at any later point in time after the indication of the interaction, such as for example, if the initiating user wants to change any of the initial one or more interaction limits after entering into the initial interaction. For example, should the initiating user need to increase the resource amount limit to allow the dedicated user to complete the interaction for additional products, the one or more interaction limits may be adjusted.

Block 208 of FIG. 2 further illustrates that one or more designated user requirements may be received for the interaction. The one or more designated requirements may include the authentication requirements that are required before the interaction can be completed by the designated user. For example, the one or more designated user requirements may include the requirement for the designated user to provide the designated user identifier (e.g., the token identifier, the code, and/or the images, as discussed with respect to block 204) that was sent to the designated user's computer system (e.g., the designated user mobile device). Alternatively, or additionally, the one or more designated user requirements may include a requirement for the designated user to produce one or more forms of identification (e.g., driver's license, or the like) when completing the interaction. In some embodiments, the one or more designated requirements may include requiring that a verification notification is to be sent to the initiating user, which requires the initiating user to respond in order to allow the interaction to occur. The verification notification may include an indication that the designated user is trying to complete the interaction, the interaction details (e.g., resource amount, products, or the like), or the like.

It should also be understood that the one or more designated user requirements, may include a requirement for the designed user to provide evidence of completion of at least a portion of the product (e.g., goods or services) before the initiating user will provide authorization for completion of the interaction. For example, the designated user may be a contractor that is working for the initiating user, and the interaction is for the purchase of supplies for completing a home improvement project. As such, before resources are released to allow the designated user to proceed to secure the supplies, the designated user may be required to provide a picture of the progress the designated user has made with respect to the home improvement project. Alternatively, and/or additionally, a location determination device (e.g., GPS, WiFi triangulation, NFC, pinging, and/or the like) in the designated user computer system may be used to monitor the location of the designated user in order to make sure the designated user is in the desired location, in route to the location of the interaction, has been at the location where the designed user is providing the service (e.g., at the house of the initiating user for a particular duration), or the like. In this way, the interaction may only be approved when the location of the designated user meets the designated user requirement (e.g., location and/or time requirement). Alternatively, and/or additionally, the initiating user may only approve the interaction when the designated user requirement related to the location of the designated user is met. Consequently, the initiating user may require the designated user to complete actions with the third-party and/or the initiating user before an interaction is allowed to proceed.

Block 210 of FIG. 2 illustrates that the interaction, the one or more interaction limits, and/or the designated user requirements may be stored by the organization (e.g., the organization that transfers the resources), sent to the organization (e.g., if the interaction, the interaction limits, and/or the designated user requirements were created by a third-party application), and/or sent to the third-party (e.g., the merchant so the merchant is aware of the pending interaction, interaction limits, and/or designated user requirements). As such, the determination of what interaction would be allowed or denied may be made by the third-party (e.g., merchant), the organization (e.g., financial institution), and/or the initiating user (e.g., through the verification notification) in whole or in part.

Block 212 of FIG. 2 illustrates that an indication is received that the designated user is trying to complete the interaction. This may occur when the designated user is located at the third-party (e.g., at the merchant) and tries to enter the interaction. Alternatively, in some embodiments, the designated user may try to enter into the interaction remotely using the designated user's mobile device, such as through a resource interaction application in which the initiating user set up the interaction, interaction limits, and/or the one or more designated user requirements. For example, the designated user may present (e.g., in person or remotely) the designated user identifier (e.g., code, mobile phone number, encrypted resource account number, products listed, or the like) to the third-party in order to enter into the interaction. The third-party product provider may capture information from the designated user mobile device (e.g., scan designated user identifier, the product list, and/or the like) about the interaction and/or receive this information remotely. In some embodiments, the third-party (e.g., the merchant) may or may not know about the interaction before-hand. As such, in some embodiments the third-party (e.g., merchant) may have to send the captured information to the organization and/or the initiating user for review and/or approval of the interaction. Alternatively, the designated user may try to complete the interaction using the resource interaction application (e.g., pay using a token account number, or the like) without the third-party realizing the designated user is not the initiating user.

Blocks 214 and 216 illustrate that verification of the one or more interaction limits and/or the one or more designated user requirements is determined. For example, the third-party directly, the organization directly, and/or a combination thereof may analyze the interaction, the interaction information, and/or designated user information in order to determine if the interaction may be completed. Additionally, the initiating user may be required to approve a portion of the interaction before the interaction is allowed to proceed.

As such, in the case when the third-party knows about the interaction, interaction limits, and/or designated user requirements, the third-party may determine on its own if the one or more interaction limits and/or the one or more designated user requirements are met. For example, the merchant may have received an indication of the interaction (e.g., preliminary interaction), the one or more interaction limits, and/or the designated user requirements from the initiating user, the organization, and/or another third-party (e.g., application provider). As such, the merchant may directly determine if the product, resource amounts, timing, or the like limits are met, and/or if the designated user requirements (e.g., identification, or the like) are met.

Alternatively, the merchant may just capture the designated user identifier (e.g., token number for the interaction for the designated user), which is then sent to the organization, and the organization may use the designated user identifier in order to determine if the one or more interaction limits and/or the one or more designated user requirements are met.

Alternatively, the initiating user may receive the interaction information from the merchant, organization, and/or the designated user after the designated user enters into the interaction. As such, the initiating user may compare the information about the interaction to the one or more interaction limits and/or the one or more designated user requirements to determine if they are met before allowing the interaction. In one specific example, only the initiating user may be able to determine if one of the interaction limits and/or the designated user requirements are met. For example, if there is a requirement attached to the interaction that at least a portion of the project (e.g., 10, 20, 30, 40, 50, 70, 90 percent, or the like) is completed before allowing the designated user to complete the interaction, the initiating user may have to verify that at least the portion of the project has been completed. Returning to the example of a contractor entering into an interaction, the designated user (e.g., contractor) may be required to send a photograph of the construction site to the initiating user in order to allow the initiating user to confirm that the progress of the interaction has been completed to the satisfaction of the initiating user before the interaction is allowed. In another example, the designated user must be located at the job site for "X" number of hours, must be located at the third-party, and/or the like before the interaction is allowed to proceed (e.g., either automatically, or after the initiating user reviews the location information and allows the interaction to proceed).

In some embodiments of the invention, instead of the initiating user, the third-party, and/or the organization making the determine that the one or more limits and/or the designated user requirements are met, machine learning and/or artificial intelligence (ML and/or AI) may be utilized in order to make the determination. For example, in some embodiments, when a requirement exits to only allow an interaction after the designated user has completed at least a portion of a project, the determination of whether or not the requirement has been met may be automated using ML and/or AI.

In one example, ML and/or AI may be used to analyze a report that the designated user is creating for the initiating user. For example, the designated user may be writing a book, drafting an article, creating a home inspection report, drafting engineering plans, or the like. As such, the system may use ML and/or AI to determine how complete the project is (e.g., the report, book, or the like service or good) before providing any partial resource transfer to the designated user. In other examples, ML and/or AI may be used to analyze photograph(s) of a project (e.g., lawn care, construction project, or the like). In one example, the designated user may take a picture of a lawn, and the system may analyze the photograph in view of one or more reference photographs (e.g., a before picture of the same project, photographs of other projects, or the like) in order to compare the photographs to estimate how complete the project is (e.g., percent completion of the project). In still other examples, ML and/or AI may be used to analyze the location of the designated user, such as determining that the designed user was located at the initiating users house for "X" hours in order to determine that the designated user was present at the user's house and/or present for an amount of time during which the project could have been completed by the designated user. (e.g., located at the user's house for 1 hour in order to complete yardwork, or the like).

It should be understood that while only some examples have been provided herein, the ML and/or AI may be utilized to automate the determination of the completion of (or partial completion of) any project (e.g., service or good being provided) that the designed user is providing to the initiating user in order to make sure that the designated user is working on the project before resource transfers are provided to the designated user.

Block 218 of FIG. 2 illustrates that the interaction is allowed to proceed when the one or more interaction limits and/or the one or more designated user requirements are met. Alternatively, block 220 illustrates that the interaction is denied when the one or more interactions limits and/or the one or more designated user requirements fail to be met.

Block 222 of FIG. 2 illustrates that the interaction is reconciled when the interaction is allowed to proceed. That is, the designated user receives the product, but the resource pool of the initiating user is accessed, and the resources are transferred from the resource pool of the initiating user to the resource pool of the third-party.

Alternatively, while the present disclosure has been generally described with respect to the initiating user entering into an interaction with a third-party merchant, in which the designated user would actually receive the product, the interaction may be made directly between the initiating user and the designated user and/or the employer of the designated user. For example, the interaction may be the designated user providing a product (e.g., a good or service) to the initiating user, such as the designated user providing a service at the initiating user's residence. In this way, the designated user may be required to meet the one or more interaction limits and/or the designated user requirements before the resources are transferred from the initiating user to the designated user (or the designated user's employer).

It should be understood that in some embodiments of the invention, the one or more designated user requirements may be set by the organization, the third-party, and/or the initiating user based on the level of security that each of the foregoing may want to accept with respect to the interaction. For example, for interactions with larger resource amounts, additional verification of the designated user may be required (e.g., sending a photo of the designated user before completion of the interaction), while for interactions with smaller resource amounts only the designated user identifier (e.g., token number) may be required to allow the interaction to be completed by the designated user. Consequently, the interaction limits and/or the designated user requirements allow for improved security related to these types of interactions and resource exchanges.

It should be understood that the systems described herein may be configured to establish a communication link (e.g., electronic link, or the like) with each other in order to accomplish the steps of the processes described herein. The link may be an internal link within the same entity (e.g., within the same organization) or a link with the other systems. In some embodiments, the one or more systems may be configured for selectively responding to dynamic inquires. These feeds may be provided via wireless network path portions through the Internet. When the systems are not providing data, transforming data, transmitting the data, and/or creating the reports, the systems need not be transmitting data over the Internet, although it could be. The systems and associated data for each of the systems may be made continuously available, however, continuously available does not necessarily mean that the systems actually continuously generate data, but that the systems are continuously available to perform actions associated with the systems in real-time (i.e., within a few seconds, or the like) of receiving a request for it. In any case, the systems are continuously available to perform actions with respect to the data, in some cases in digitized data in Internet Protocol (IP) packet format. In response to continuously receiving real-time data feeds from the various systems, the systems may be configured to update actions associated with the systems, as described herein.

Moreover, it should be understood that the process flows described herein include transforming the data from the different systems (e.g., internally or externally) from the data format of the various systems to a data format associated with a particular display. There are many ways in which data is converted within the computer environment. This may be seamless, as in the case of upgrading to a newer version of a computer program. Alternatively, the conversion may require processing by the use of a special conversion program, or it may involve a complex process of going through intermediary stages, or involving complex "exporting" and "importing" procedures, which may convert to and from a tab-delimited or comma-separated text file. In some cases, a program may recognize several data file formats at the data input stage and then is also capable of storing the output data in a number of different formats. Such a program may be used to convert a file format. If the source format or target format is not recognized, then at times a third program may be available which permits the conversion to an intermediate format, which can then be reformatted.

As will be appreciated by one of skill in the art in view of this disclosure, embodiments of the invention may be embodied as an apparatus (e.g., a system, computer program product, and/or other device), a method, or a combination of the foregoing. Accordingly, embodiments of the invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the invention may take the form of a computer program product comprising a computer-usable storage medium having computer-usable program code/computer-readable instructions embodied in the medium (e.g., a non-transitory medium, or the like).

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the invention may be written in an object oriented, scripted or unscripted programming language such as Java, Pearl, Python, Smalltalk, C++ or the like. However, the computer program code/computer-readable instructions for carrying out operations of the invention may also be written in conventional procedural programming languages, such as the "C" programming language or similar programming languages.

Embodiments of the invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

Specific embodiments of the invention are described herein. Many modifications and other embodiments of the invention set forth herein will come to mind to one skilled in the art to which the invention pertains, having the benefit of the teachings presented in the foregoing descriptions and the associated drawings. Therefore, it is to be understood that the invention is not to be limited to the specific embodiments disclosed and that modifications and other embodiments and combinations of embodiments are intended to be included within the scope of the appended claims. Although specific terms are employed herein, they are used in a generic and descriptive sense only and not for purposes of limitation.

What is claimed is:

1. A resource interaction and exchange system, the system comprising:
    one or more memory components having computer readable code stored thereon; and
    one or more processing components operatively coupled to the one or more memory components, wherein the one or more processing components are configured to execute the computer readable code to:
        receive one or more designated user requirements from an initiating user for an interaction;
        sending the one or more designated user requirements to a third-party system of a third-party or a designated user system of a designated user;
        receive one or more interaction limits from the initiating user for the interaction;
        sending the one or more interaction limits to the third-party system of a third-party or the designated user system of the designated user;

identify initiation of the interaction between the initiating user and the third-party;

identify the designated user is completing the interaction with the third-party;

receive verification from the third-party system that the designated user completing the interaction has met the one or more designated user requirements and the interaction meets the one or more interaction limits;

allow the interaction when the one or more interaction limits and the one or more designated user requirements are met;

deny the interaction when at least one of the one or more interaction limits or the one or more designated user requirements fail to be met; and reconcile the interaction when the interaction is allowed by transferring resources of the initiating user to the third-party.

2. The system of claim 1, wherein
the one or more designated user requirements are sent to the third-party system.

3. The system of claim 1, wherein
the one or more designated user requirements are sent to the designated user system.

4. The system of claim 1, wherein the one or more designated user requirements comprise a designated user identifier comprising one or more of a designed user name, address, photograph, a mobile phone number, location determination device indicator, digital wallet number, or a tokenized interaction string.

5. The system of claim 1, wherein the one or more processing components are configured to execute the computer readable code to:

send an interaction notification to an initiating user system; and receive an interaction verification from the initiating user system indicating that the interaction is approved.

6. The system of claim 4, wherein the interaction notification comprises a project photograph illustrating completion of at least a portion of a project.

7. The system of claim 1, wherein
the one or more interaction limits are sent to the third-party system.

8. The system of claim 1, wherein
the one or more interaction limits are sent to a designated user system.

9. The system of claim 1, wherein the one or more interaction limits comprise a resource amount, an interaction completion time, one or more specific products.

10. The system of claim 1, wherein the one or more processing components are configured to execute the computer readable code to:

provide the one or more interaction limits or the one or more designated user requirements to the third-party system through the designed user computer system.

11. The system of claim 1, wherein identifying the initiation of the interaction between the initiating user and the third-party comprises:

receiving an indication from the initiating user regarding the interaction with the third-party.

12. The system of claim 1, wherein identifying the designated user completing the interaction with the third-party comprises receiving an identity of the designated user from the initiating user system.

13. The system of claim 12, wherein the identity of the designated user is based on a mobile device number, a digital wallet identification, a designated user identifier, a designated user photograph, a designated user photograph ID.

14. A computer implemented method for a resource interaction and exchange system, the method comprising:

receiving, by one or more processing components, one or more designated user requirements from an initiating user for an interaction;

sending, by the one or more processing components, the one or more designated user requirements to a third-party system of a third-party or a designated user system of a designated user;

receiving, by the one or more processing components, one or more interaction limits from the initiating user for the interaction;

sending, by the one or more processing components, the one or more interaction limits to the third-party system of a third-party or the designated user system of the designated user;

identifying, by the one or more processing components, initiation of the interaction between the initiating user and the third-party;

identifying, by the one or more processing components, the designated user is completing the interaction with the third-party;

receiving, by the one or more processing components, verification from the third-party system that the designated user completing the interaction has met the one or more designated user requirements and the interaction meets the one or more interaction limits;

allowing, by the one or more processing components, the interaction when the one or more interaction limits and the one or more designated user requirements are met;

denying, by the one or more processing components, the interaction when at least one of the one or more interaction limits or the one or more designated user requirements fail to be met; and reconciling, by the one or more processing components, the interaction when the interaction is allowed by transferring resources of the initiating user to the third-party.

15. The method of claim 14, wherein
the one or more designated user requirements are sent to the third-party system.

16. The method of claim 14, wherein
the one or more interaction limits are sent to the third-party system.

17. The method of claim 14, further comprising
sending an interaction notification to an initiating user system; and receiving an interaction verification from the initiating user system that the interaction is approved.

18. A computer program product for a resource interaction and exchange system, the computer program product comprising at least one non-transitory computer-readable medium having computer-readable program code portions embodied therein, the computer-readable program code portions comprising:

an executable portion configured to receive one or more designated user requirements from an initiating user for an interaction;

an executable portion configured to send the one or more designated user requirements to a third-party system of a third-party or a designated user system of a designated user;

an executable portion configured to receive one or more interaction limits from the initiating user for the interaction;

an executable portion configured to send the one or more interaction limits to the third-party system of a third-party or the designated user system of the designated user;

an executable portion configured to identify initiation of the interaction between the initiating user and the third-party;

an executable portion configured to identify the designated user is completing the interaction with the third-party;

an executable portion configured to receive verification from the third-party system that the designated user completing the interaction has met the one or more designated user requirements and the interaction meets the one or more interaction limits;

an executable portion configured to allow the interaction when the one or more interaction limits and the one or more designated user requirements are met;

an executable portion configured to deny the interaction when at least one of the one or more interaction limits or the one or more designated user requirements fail to be met; and an executable portion configured to reconcile the interaction when the interaction is allowed by transferring resources of the initiating user to the third-party.

* * * * *